United States Patent
Lazur

(10) Patent No.: US 10,151,207 B2
(45) Date of Patent: Dec. 11, 2018

(54) HIGH STRENGTH JOINTS IN CERAMIC MATRIX COMPOSITE PREFORMS

(71) Applicant: Rolls-Royce Corporation, Indianapolis, IN (US)

(72) Inventor: Andrew Joseph Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 371 days.

(21) Appl. No.: 15/010,797

(22) Filed: Jan. 29, 2016

(65) Prior Publication Data

US 2016/0146028 A1    May 26, 2016

Related U.S. Application Data

(62) Division of application No. 14/097,866, filed on Dec. 5, 2013, now Pat. No. 9,291,060.
(Continued)

(51) Int. Cl.
*B32B 18/00* (2006.01)
*F01D 5/28* (2006.01)
(Continued)

(52) U.S. Cl.
CPC ............ *F01D 9/041* (2013.01); *B32B 18/00* (2013.01); *B32B 37/14* (2013.01); *F01D 5/147* (2013.01);
(Continued)

(58) Field of Classification Search
CPC .......... F01D 9/041; F01D 5/282; F01D 5/147; B32B 18/00; B32B 37/14; F05D 2300/43;
(Continued)

(56) References Cited

U.S. PATENT DOCUMENTS 5,738,749 A * 4/1998 Grimshaw ............ B29C 70/388
156/312
5,939,216 A * 8/1999 Kameda ................. C04B 35/08
428/323
(Continued)

FOREIGN PATENT DOCUMENTS

FR    1 424 045    1/1966
FR    2 961 845    12/2011
(Continued)

OTHER PUBLICATIONS

International Search Report, dated May 22, 2014, pp. 1-4, International Application No. PCT/US2013/075779, European Patent Office, Rijswijk, The Netherlands.

*Primary Examiner* — Sarang Afzali
*Assistant Examiner* — Darrell C Ford
(74) *Attorney, Agent, or Firm* — Brinks Gilson & Lione

(57) ABSTRACT

A joint between a first preform component and a second preform component that are constructed for ultimate use in a gas turbine engine includes a plurality of extended fibers which may be integral with the first preform component and be at least partially enveloped by the second preform component. A method for making the component provides a first preform component having extended fibers integral therewith, and supplying a second preform component. The method further includes inserting the extended fibers at least partially into the second preform component body.

20 Claims, 6 Drawing Sheets

Related U.S. Application Data

(60) Provisional application No. 61/783,005, filed on Mar. 14, 2013.

(51) Int. Cl.
*F01D 5/14* (2006.01)
*B32B 37/14* (2006.01)
*F01D 9/04* (2006.01)

(52) U.S. Cl.
CPC .......... *F01D 5/282* (2013.01); *C04B 2237/38* (2013.01); *F05D 2220/32* (2013.01); *F05D 2230/23* (2013.01); *F05D 2230/31* (2013.01); *F05D 2230/51* (2013.01); *F05D 2230/90* (2013.01); *F05D 2300/10* (2013.01); *F05D 2300/2261* (2013.01); *F05D 2300/43* (2013.01); *F05D 2300/6033* (2013.01); *F05D 2300/611* (2013.01); *F05D 2300/614* (2013.01); *Y10T 29/4932* (2015.01); *Y10T 29/49337* (2015.01); *Y10T 29/49801* (2015.01); *Y10T 156/10* (2015.01); *Y10T 428/2414* (2015.01)

(58) Field of Classification Search
CPC ............. F05D 2300/10; F05D 2230/31; F05D 2230/90; F05D 2300/611; F05D 2220/32; F05D 2300/2261; F05D 2300/6033; F05D 2230/51; F05D 2230/23; F05D 2300/614; Y10T 156/10; Y10T 428/2414; Y10T 29/49801; Y10T 29/4932; Y10T 29/49337; C04B 2237/38
USPC ................................ 29/889.2, 419.1, 889.71
See application file for complete search history.

(56) References Cited

U.S. PATENT DOCUMENTS

| | | | |
|---|---|---|---|
| 6,418,973 B1* | 7/2002 | Cox | B32B 5/26 139/383 R |
| 9,045,992 B2 | 6/2015 | Roussille et al. | |
| 9,908,305 B2* | 3/2018 | Chamberlain | B32B 5/022 |
| 9,926,657 B2* | 3/2018 | Higgins | A47G 27/0212 |
| 2005/0022921 A1 | 2/2005 | Morrison et al. | |
| 2006/0089071 A1* | 4/2006 | Leidig | B29C 65/08 442/381 |
| 2006/0120874 A1 | 6/2006 | Burke et al. | |
| 2006/0284337 A1* | 12/2006 | Subramanian | C04B 35/573 264/258 |
| 2007/0292669 A1 | 12/2007 | Yamasaki et al. | |
| 2008/0138578 A1* | 6/2008 | Kienzle | C04B 35/573 428/141 |
| 2011/0097554 A1* | 4/2011 | Kehrl | B29C 70/207 428/174 |
| 2011/0151248 A1 | 6/2011 | Manicke et al. | |
| 2011/0293828 A1* | 12/2011 | Eberling-Fux | B29B 11/16 427/249.2 |
| 2012/0076973 A1* | 3/2012 | Guzman | B29C 70/207 428/113 |
| 2012/0251793 A1* | 10/2012 | Goering | B29B 11/16 428/192 |
| 2014/0133989 A1 | 5/2014 | Belmonte et al. | |

FOREIGN PATENT DOCUMENTS

| | | |
|---|---|---|
| FR | 2 976 968 | 12/2012 |
| JP | 2003 148105 | 5/2003 |

* cited by examiner

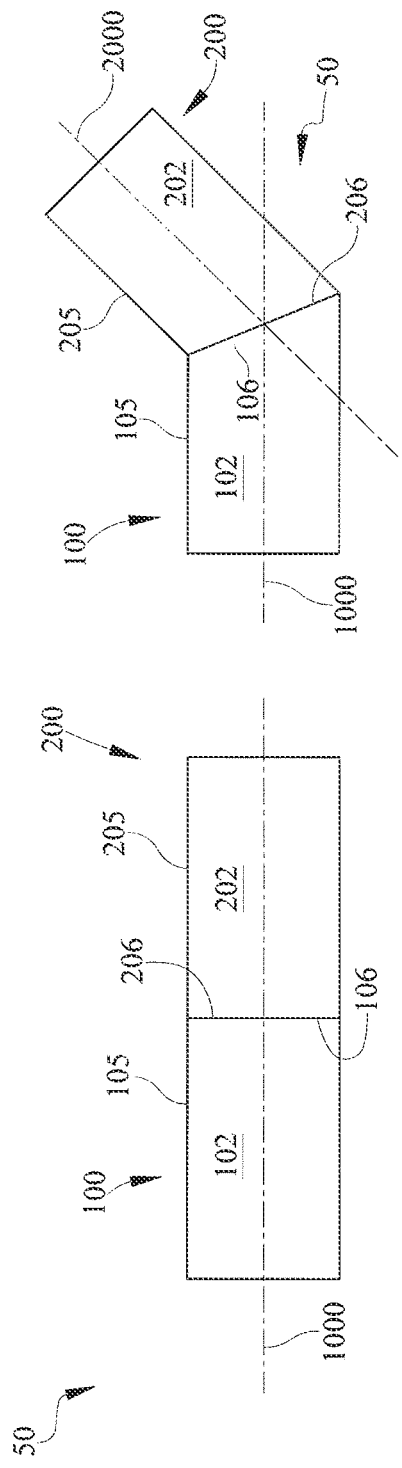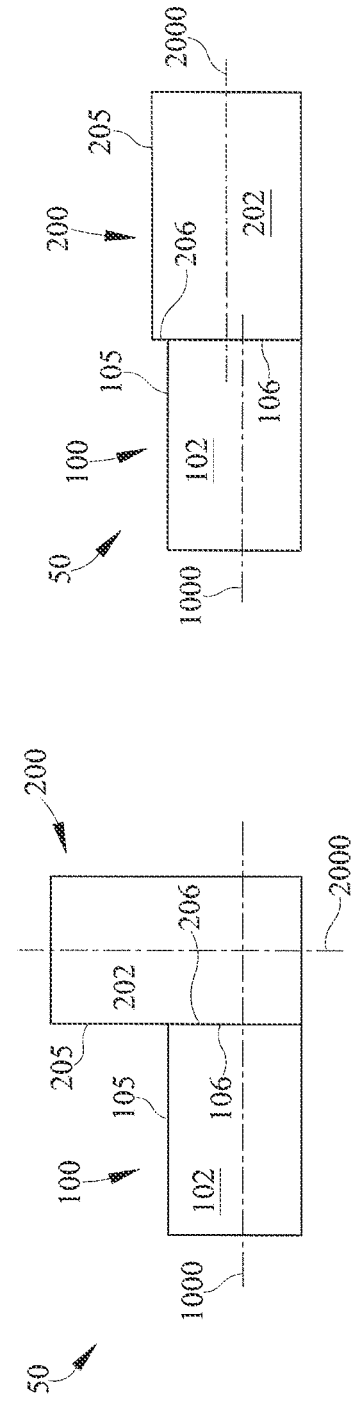

HIGH STRENGTH JOINTS IN CERAMIC MATRIX COMPOSITE PREFORMS

CROSS REFERENCE

The present application is a divisional application of, and claims priority under 35 U.S.C. § 120 to U.S. Non-Provisional application Ser. No. 14/097,866, "High Strength Joints in Ceramic Matrix Composite Preforms", filed Dec. 5, 2013, which issued as U.S. Pat. No. 9,291,060 and is incorporated by reference in its entirety, and which claims priority to U.S. Provisional Application No. 61/783,005, filed Mar. 14, 2013, entitled "High Strength Joints in Ceramic Matrix Composite Preforms".

TECHNICAL FIELD

The present disclosure generally relates to joined composite preforms such as ceramic matrix composite preforms useful to produce a gas turbine engine component, and more particularly, but not exclusively, to a joint used to join the composite preforms.

BACKGROUND

Providing joined structures with adequate performance at the joint such as shear, pull out strength, and toughness remains an area of interest. Some existing systems have various shortcomings relative to certain applications. Accordingly, there remains a need for further contributions in this area of technology.

SUMMARY

One embodiment of the present disclosure is a unique joint structure for composite preforms. Other embodiments include methods for constructing the aforementioned joint structure. Further embodiments, forms, features, aspects, benefits, and advantages of the present application shall become apparent from the description and figures provided herewith.

BRIEF DESCRIPTION OF THE DRAWINGS

FIG. 8A illustrates a first example of a joint created between preform components lying in a distinct plane.

FIG. 8B illustrates a second example of a joint created between preform components lying in a distinct plane.

FIG. 8C illustrates a third example of a joint created between preform components lying in a distinct plane.

FIG. 8D illustrates a fourth example of a joint created between preform components lying in a distinct plane.

DETAILED DESCRIPTION

Figure 1:
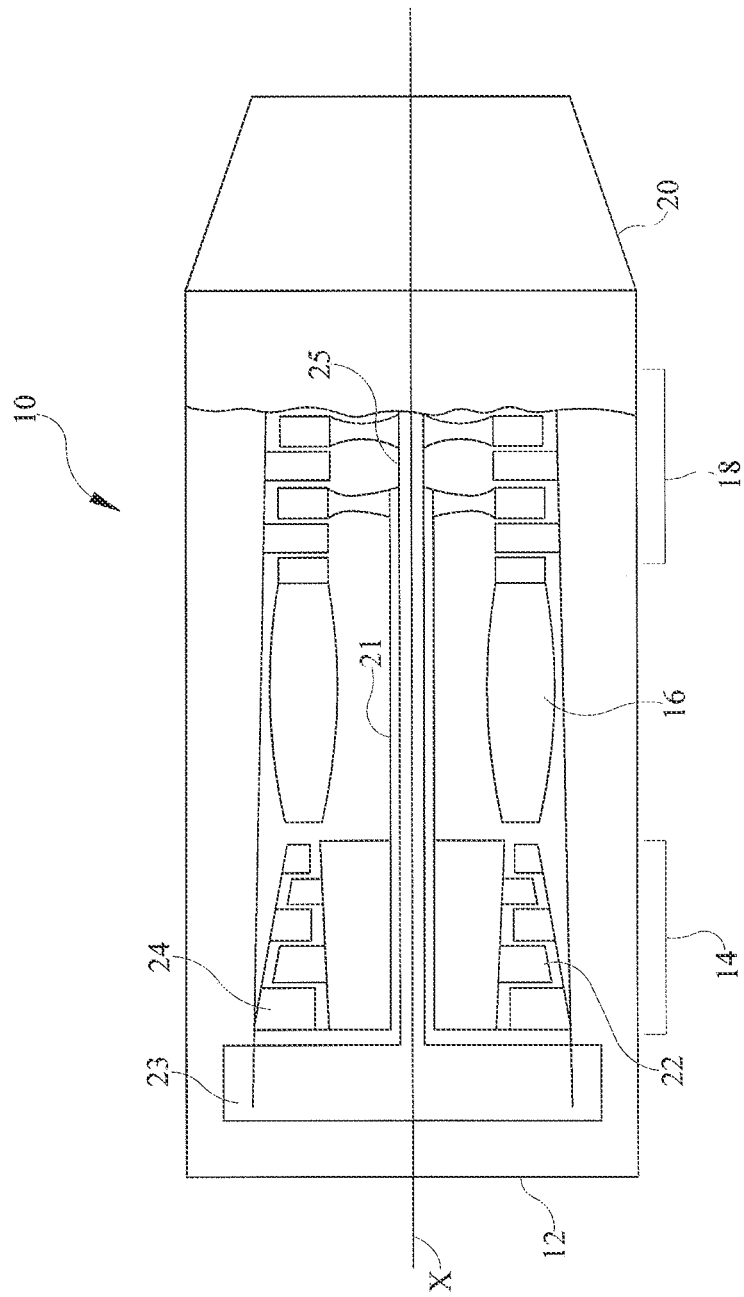
FIG. 1 is a cross-sectional schematic view of a gas turbine engine.

For purposes of promoting an understanding of the principles of the disclosure, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, a schematic view of a gas turbine engine 10 is depicted. While the gas turbine engine is illustrated with two spools, it should be understood that the present invention is not limited to any particular engine design or configuration and as such may be used in single or multi spool engines. The gas turbine engine 10 will be described generally, however significant details regarding general gas turbine engines will not be presented herein as it is believed that the theory of operation and general parameters of gas turbine engines are well known to those of ordinary skill in the art.

The gas turbine engine 10 includes an inlet section 12, a compressor section 14, a combustor section 16, a turbine section 18, and an exhaust section 20. In operation, air is drawn in through the inlet 12 and compressed in the compressor section 14 to a high pressure relative to ambient pressure of the gas turbine engine 10. The compression section 14 includes plurality of stages with rotating blades 22 that operate to compress working fluid and vanes 24 positioned upstream of a rotating blade 22 to control aerodynamic properties of the working fluid entering into the rotating stage.

The compressed air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 21, which rotates about a centerline axis X that extends axially along the longitudinal axis of the engine 10. As the turbine section 18 rotates due to the forces generated by the high pressure working fluid, the compressor section 14 is rotatingly driven by the turbine section 18 via the shaft 21 to produce compressed air. A portion of the power extracted from the turbine section 18 can be utilized to drive a second device 23 through a second shaft 25, such as a fan, an electrical generator, gas compressor or pump and the like.

Many composite components utilized within a gas turbine engine may be made of a ceramic matrix composite ("CMC"), as they are suitable for operational use in the high pressure and high temperature internal operating environment of a gas turbine engine. CMCs will be described generally, however significant details regarding CMC formation and manufacture will not be presented as it is believed that the general aspects of CMC manufacturing are well known to those of ordinary skill in the art. It is appreciated that while general aspects of CMC manufacturing are disclosed in the present application, many variations in the processes and materials used are envisioned in the present application and no limitation of the scope of the invention is thereby intended.

CMCs are first made from a lay-up of a plurality of fibers and formed to a desired shape. At this stage in the production of a CMC component, the lay-up is generally known as a fiber preform or preform. The fiber preform can be can be partially-rigidized or un-rigidized and can be constructed in any number of different configurations, for example, the preform may be made of filament windings, braiding, and knotting of fibers, as well as made of two-dimensional and three-dimensional fabrics, unidirectional fabrics, and non woven textiles. The fibers used in the preform, furthermore, can be made from any number of the materials such as, but not limited to, ceramic fibers, organic fibers, metallic fibers, and glass fibers. The preform can be of near-net shape and/or machined and/or undergo further treatments such as coating or impregnation of the matrix material.

During construction of the CMC the fiber arrangement can be infiltrated with a matrix material. The matrix can be made of any number of materials such as, but not limited to, polymers, metals, and ceramics, such as silicon carbide, and silicon/silicon carbide. The preform can be infiltrated with the matrix using any number of processes such as, but not limited to deposition from a gas phase, such as chemical vapor deposition or chemical vapor infiltration, pyrolysis, chemical reaction, sintering, and electrophoresis. Finally, the part may be machined, if necessary to bring the part geometry into the required specifications.

Figure 2:
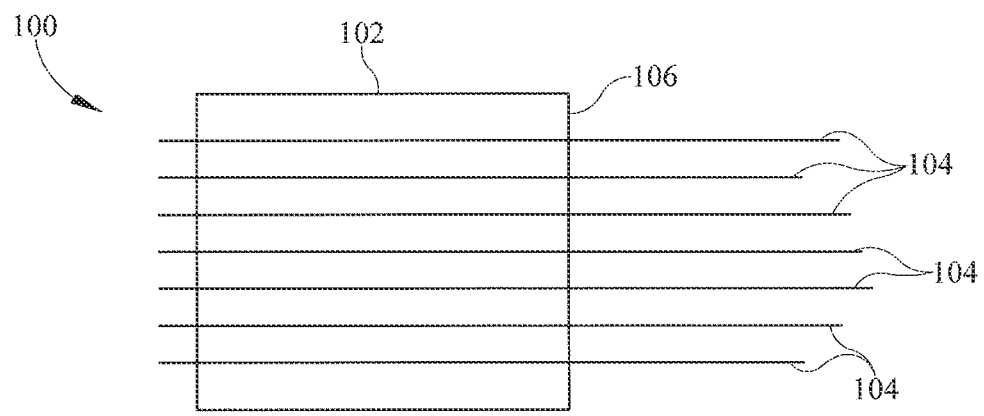
FIG. 2 Illustrates a preform component with extended fibers.

With reference to FIG. 2, an example fiber preform component 100 is provided with a main body 102 that includes a plurality of interwoven body fibers. The plurality of interwoven body fibers may be a two-dimensional or three-dimensional weave, or any of the above-mentioned fabrics. For clarity, these interwoven body fibers are not shown in any of the figures. However, it is appreciated that the preforms disclosed herein may contain such fibers. It is assumed that these types of fibers are readily apparent to those skilled in the art, and the focus of the disclosure will center on the extended fibers 104, 204 discussed in more detail herein.

The main body 102 also includes an end surface 106, which in some of the illustrated embodiments discussed herein is used to be engaged in proximity to an adjacent preform component. A plurality of fibers are configured as extended fibers 104 which can be integrally provided within, or at least partially integrated or embedded within, the body 102, and have an extended or protruding portion that protrudes away from the end surface 106. The extended fibers 104 may be disposed within the interstices of the interwoven body fibers of the body 102. The extended fibers 104 can but need not be the same type as the interwoven body fibers. The plurality of extended fibers 104 may be bundled or single monofilaments, and may even be a single bundle. The plurality of extended fibers 104 may be varied in length and spacing. In addition, the extended fibers 104 may also, but not necessarily, extend out of the surface opposite the end surface 106 similar to that shown in FIG. 2. Furthermore, the fiber preform component 100 may be infiltrated with a matrix.

Figure 3:
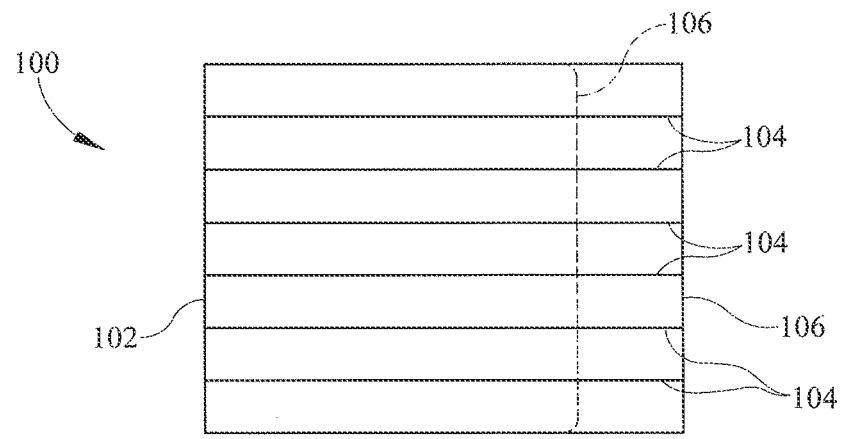
FIG. 3 depicts a preform component with stiffened internal fibers.

With reference to FIG. 3, another example preform component is illustrated in which the fibers 104 are initially contained within the main body 102 of the preform but, through a manufacturing operation, at least a portion of the main body 102 is compressed resulting in the fibers 104 being exposed and protruding from the main body 102. The preform is made of a plurality of interwoven body fibers (not shown) and includes an end surface 106. A plurality of fibers 104 are integrally provided within or at least partially integrated or embedded within the main body 102.

The plurality of fibers 104 may be extended out of the main body 102, through the end surface 106, by compressing the body 102 and thereby compressing the interwoven body fibers that are less stiff than the plurality fibers 104 that remain. The extended fibers 104 in the illustrated embodiment tend to be more rigid than the interwoven body fibers of the body 102, such that the interwoven body fibers of the body 102 are more compliant than the extended fibers 104. It is appreciated that only a portion of the body 102 or the entire body 102 may be compressed. The body 102 only needs to compress enough for the extended fibers 104 to sufficiently extend through the end surface 106. The body 102 may be compressed as the end surface 106 is pressed against a second preform component 200, as described in greater detail herein. As is shown, the end surface 106 of the uncompressed body 102 is shown as a solid line and the end surface 106 of the compressed body 102 is shown as a dashed line.

Referring to FIGS. 4-7, example apparatuses 50 are provided by joining a first preform component 100 to a second preform component 200. The first preform component 100 is provided with a main body 102, made of a plurality of interwoven body fibers (not shown), and having an end surface 106. A plurality of extended fibers 104 are integrally provided within or at least partially integrated or embedded within the body 102 and have an extended portion that extends or protrudes through and away from the end surface 106. The second preform component 200 is also provided with a main body 202 made of a plurality of interwoven body fibers (not shown) and having an end surface 206. End surfaces 106, 206 are brought together and a joint is created at this interface. At least a portion of the extended fibers 104 extend into and are enveloped by the body 202 of the second preform component 200. The fibers 104 can be received within a space of the second preform component 200 such that the fibers 104 are not in contact with any fibers of the second component 200, but in some embodiments any or all of the fibers 104 can contact one or more fibers of the second component 200. The extended fibers 104 may be received within a preformed opening in the second component 200, or within the interstices of the second component's body fibers (not shown).

Various means may be provided to ease or aid insertion of the extended fibers into a preform. For example, a fibrous reinforcement that is accepting extended fibers may be locally altered to reduce the fiber volume to ease insertion, or to tailor local mechanical properties, or to aid with matrix processing. The preform component 200 accepting the fibers 104 may also include or be supplied with interstitial openings (not shown) spaced to correspond with the spacing of the plurality of extended fibers. This may ease insertion, provide registration of the preforms, and improve the strength of the joint. In addition, one or more lubricants may be utilized to ease the insertion process and reduce fiber damage during insertion, as well as to reduce buckling loads on the fibers and the required insertion force. Ultrasonic vibration may also be used to aid in insertion of the fibers.

Appropriate tooling and/or fixtures may be necessary to provide proper support of the preform components as they are pressed together, and to prevent long fibers from buckling during and to ease insertion. To further aid in the prevention of fiber buckling, a low strength polymer may be cast over the fibers such that as force is applied, and the extended fibers are inserted into the other preform component, the polymer is progressively extruded from the joint. Removable fixturing may also serve the same purpose.

Figure 4:
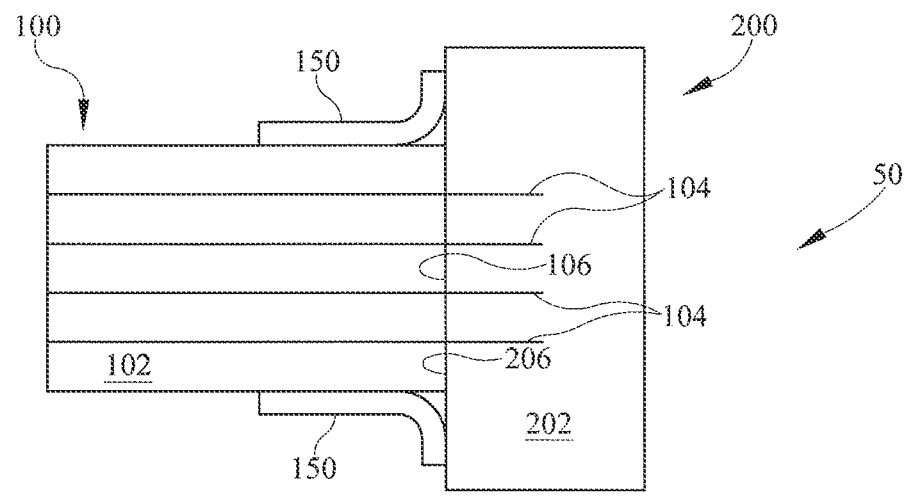
FIG. 4 shows a preform component joined to another preform component, with fibers extending from one preform component into the other.

With specific reference to FIG. 4, as the joint is created and the end surfaces 106, 206 are brought together, the plurality of extended fibers 104 penetrate the end surface 206 and into the body 202 of the second preform component 200. Thus, the second preform component 200 envelopes and defines an extended portion of the extended fibers 104. To further strengthen this joint, one or more laminate strips 150 may be disposed about or applied to this joint.

Figure 5:
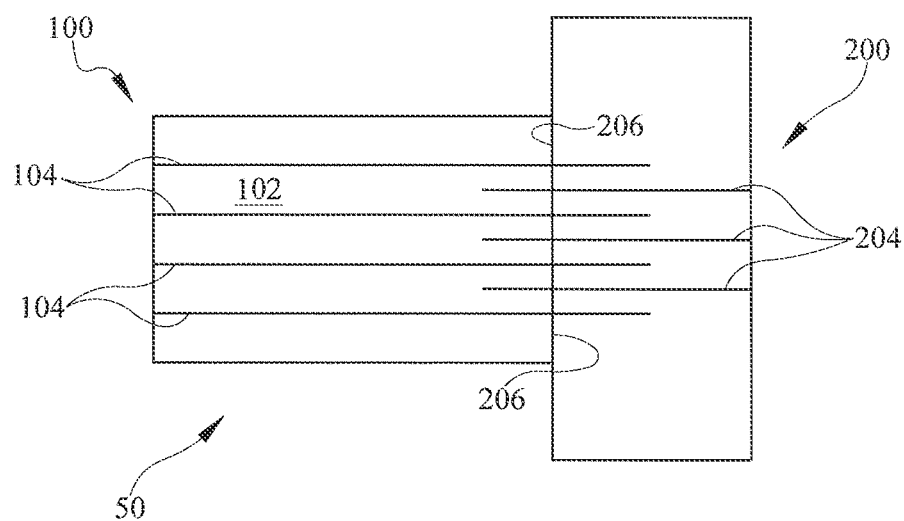
FIG. 5 represents a preform component joined to another preform component, with fibers extending from both preform components into one another.

Referring now to FIG. 5, the second preform component 200 is provided with a second plurality of extended fibers 204 integrally provided within or at least partially integrated or embedded within the body 202 and have an extended portion that extends through and away from the end surface 206. As the joint is created and the end surfaces 106, 206 are brought together, the first plurality of extended fibers 104 penetrate the second end surface 206 and into the body 202 of the second preform component 200, and the second plurality of extended fibers 204 penetrate the first end surface 106 and into body 102 of the first preform component 100. Thus, the second preform component 200 envelopes and defines an extended portion of the first plurality of extended fibers 104, and the first preform component 100 envelopes and defines an extended portion of the second plurality of extended fibers 204. To further strengthen this joint, one or more laminate strips (not shown) may be disposed about this joint. The extended fibers of either or both the first preform 100 and second preform 200, and/or either or both of the first and second preforms 100, 200 can be created, inserted, extended, modified, coated, treated, manipulated, etc according to any of the description above.

Figure 6:
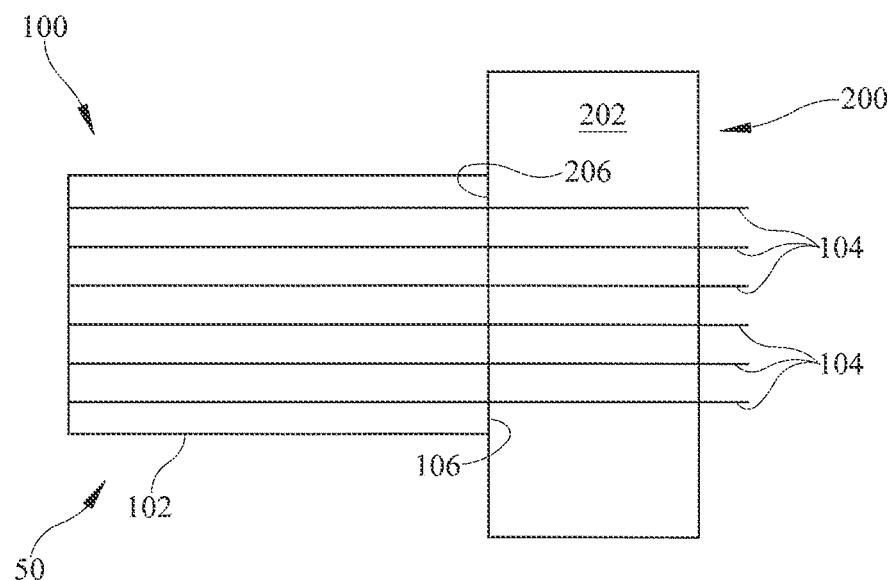
FIG. 6 illustrates two preform components joined together with fibers extending from one preform component through the other preform component.

With specific reference to FIG. 6, as the joint is created and the end surfaces 106, 206 are brought together, the plurality of extended fibers 104 penetrate the end surface 206 and extend entirely through the body 202 of the second preform component 200. Thus, the second preform component 200 at least partially envelopes and defines an extended portion of the extended fibers 104. To further strengthen this joint, one or more laminate strips (not shown) may be disposed about this joint. The extended fibers of the preform 100, and for that matter either of the preforms 100 and 200, can be created, inserted, extended, modified, coated, treated, manipulated, etc according to any of the description above.

Figure 7:
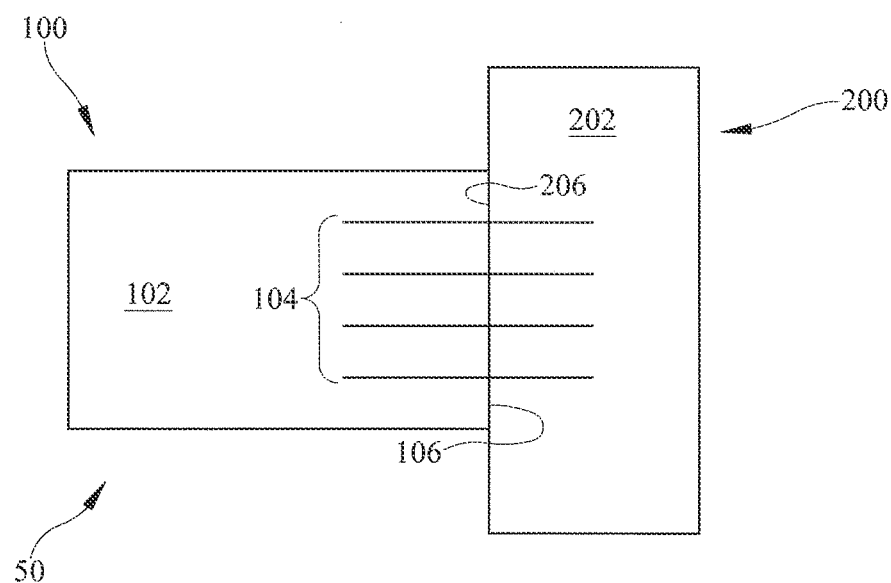
FIG. 7 depicts two joined preform components with fibers extending partially through each preform component.

With reference to FIG. 7, a joint is created at an interface between the end surfaces 106, 206. As this joint is created and the end surfaces 106, 206 are brought together, the plurality of extended fibers 104 penetrate the end surface 206 and into the body 202 of the second preform component 200. Thus, the second preform component 200 envelopes and defines an extended portion of the extended fibers 104. To further strengthen this joint, one or more laminate strips (not shown) may be disposed about this joint. A difference between this embodiment and those shown and described in FIGS. 4-6, is that the set of fibers 104 are only located at or near the joint, and not necessarily continuous throughout the entire first preform body 102. The fibers 104 can be inserted into the body 202 or can be formed simultaneous with other fibers (not shown, but similar in some embodiment to the fibers shown in FIG. 5) that are formed together in the body. The first preform body 102 can be infused with polymers or other materials to hold the extended fibers 104 in place during insertion of the fibers 104. It is appreciated that this infusion process may also be utilized in the other examples discussed herein. Furthermore, the fibers 104, and for that matter either of the preforms 100 and 200, can be created, inserted, extended, modified, coated, treated, manipulated, etc according to any of the description above.

In any of the embodiments shown in FIGS. 4-7 and described in their associated text, the extended fibers 104, 204 may extend prior to joining the two preform components 100, 200, or be extended during fabrication of the joint by compressing the respective bodies 102, 202 (see FIG. 3), as described herein. It is appreciated that to be integral with or embedded within their preform, the plurality of extended fibers may be continuous through the form or be present just adjacent to the joint, as is shown in FIG. 7. Penetration depth of the fibers may range from 0.010 inches to the entire thickness and even through the other form. The fibers may uniformly extend or protrude from a form, or may include some local variation in extension from the form for any variety of reasons. In addition, the extended length of the fibers may also vary locally (see FIG. 2). Though only two preform components 100, 200 are shown in the above described embodiments, it is appreciated that more than two preform components may be joined together as described herein (see FIG. 9).

Figure 9:
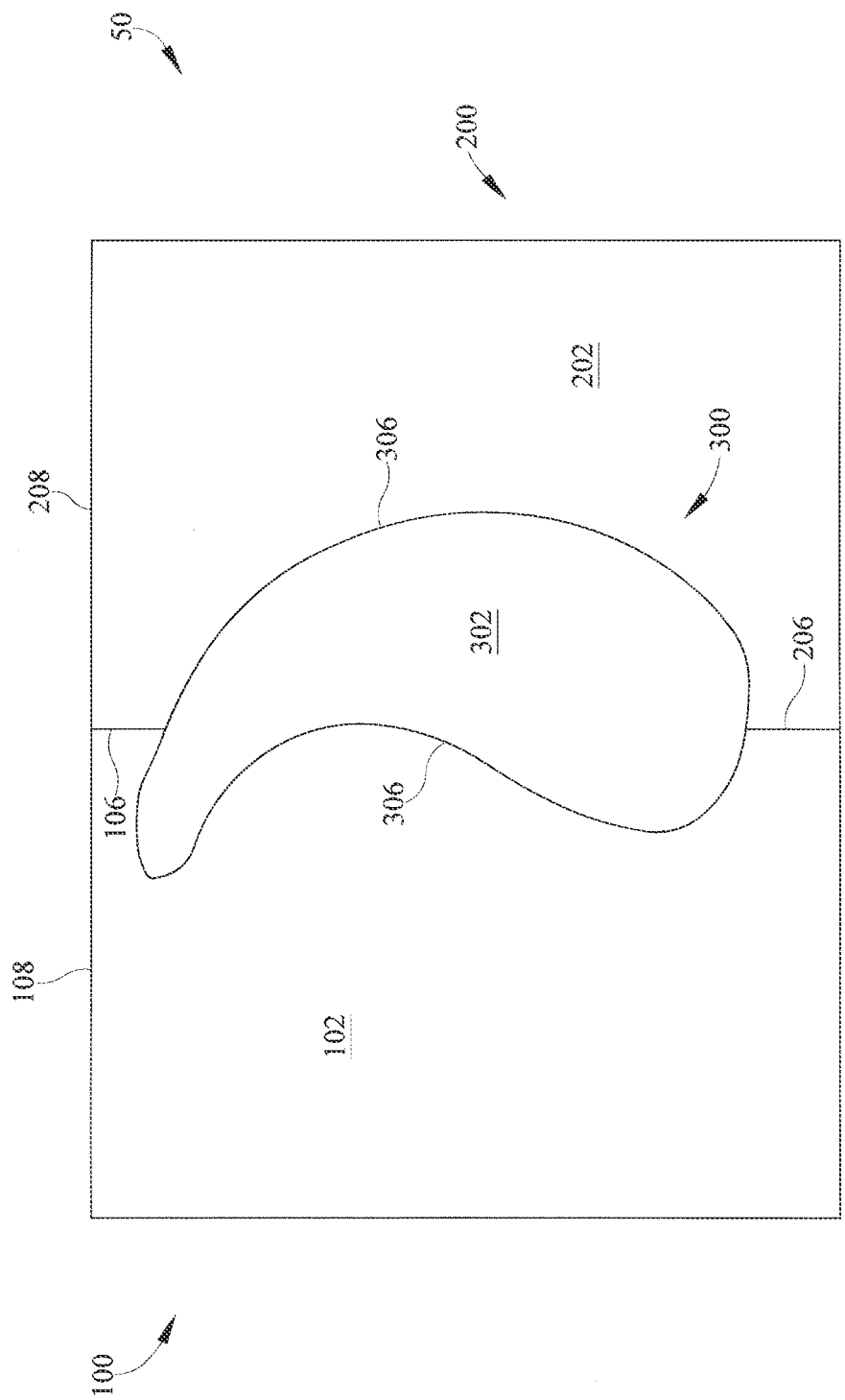
FIG. 9 depicts an embodiment of joints created between multiple preform components lying in multiple distinct planes.

The abutting end surfaces 106, 206 are preferably geometrically matched. However they need not lie in a single plane, as the present disclosure envisions the joining of both simple and complex curved surfaces. Furthermore, it is appreciated that when creating the joint between the two preform components 100, 200, the preform components 100, 200 can be at any arrangement relative to one another so long as fiber insertion remains possible. For example, the reform components 100, 200 may be either coplanar or they may be on distinct planes. As used herein, the phrase "distinct planes" may carry a wide range of definitions. This phrase will now be explained in more detail. Referring to FIGS. 8A-8D, a variety of example apparatuses 50 are shown in cross-section with each component lying in a plane. FIG. 9 depicts multiple components in cross-section that lie in multiple and distinct planes. For clarity, the extended or protruding fibers of the present disclosure are not shown in FIGS. 8A-9.

As shown in FIG. 8A, an example apparatus 50 is created by joining two coplanar preform components 100, 200. The preform bodies 102, 202 share a common longitudinal axis 1000 and the surfaces adjacent to the joint 105, 205 also lie on a common plane.

Referring to FIG. 8B, an example apparatus 50 is created by joining two preform components 100, 200. The first preform body 102 has a first longitudinal axis 1000, and the second preform body 202 has a second longitudinal axis 2000 that may intersect with or be skew to the first longitudinal axis 1000 such that the first and second preform bodies 102, 202 lie on intersecting planes distinct and separate from one another. Furthermore, the surfaces 105, 205 adjacent to the joining end surfaces 106, 206 also lie on distinct and separate intersecting planes.

Referring to FIG. 8C, an example apparatus 50 is created by joining two preform components 100, 200. The first preform body 102 has a first longitudinal axis 1000, and the second preform body 202 has a second longitudinal axis 2000 that may orthogonal to the first longitudinal axis 1000. Thus, the first and second preform bodies 102, 202 lie on intersecting planes distinct and separate from one another. Furthermore, the surfaces 105, 205 adjacent to the joining end surfaces 106, 206 also lie on distinct and separate intersecting planes.

Referring now to FIG. 8D, an example apparatus 50 is created by joining two preform components 100, 200. The first preform body 102 has a first longitudinal axis 1000, and the second preform body 202 has a second longitudinal axis 2000 that may parallel or skew to the first longitudinal axis 1000 such that the first and second preform bodies 102, 202 lie on parallel planes distinct and separate from one another. Furthermore, the surfaces 105, 205 adjacent to the joining end surfaces 106, 206 also lie on distinct and separate parallel planes.

With reference now to FIG. 9, another example apparatus 50 is provided by joining three preform components 100, 200, 300. As shown, the first and second preform components 100, 200 are shown as having generally rectangular bodies 102, 202 yet having complexly curved joining end surfaces 106, 206. Though shown as a two-dimensional curve in a cross-section, it is appreciated that the end surfaces may have a complex three-dimensional curved surface. The third preform component 300 is shown as generally having a cross-sectional shape 302 of an airfoil that has a complex three-dimensionally curved joining end surface 306. In this embodiment, the first and second joined preform components 100, 200 may be coplanar, though they may also be in distinct planes, yet the third preform component 300 lies in multiple planes that are distinct and separate from the first and second preform components 100, 200.

The disclosure applies to a variety of fibers such as, for example, one or more of the following: glass, carbon, aramid, ceramic oxide, ceramic nitride, and ceramic carbide. Examples of ceramic carbide may be silicon carbide ("SiC") such as that sold under the trade name Nicalon and manufactured by the Nippon Carbon Co., Ltd. of Tokyo, Japan. The disclosure also applies to a variety of matrices such as, for example, one or more of the following: polymers, metals, and ceramics such as SiC, and silicon/silicon carbide. The disclosed joint may also prove useful with matrices that exhibit low strength and toughness such as, for example, silicon carbide, alumina, mullite, carbon, silicon, silicon/silicon carbide particulate, untoughened epoxy, polyimide, vinyl ester, and polyester.

The extended fibers may be bundled fibers or monofilaments. Monofilaments such as a SiC fiber sold under the trade name SCS Silicon Carbide Fiber, manufactured by Specialty Materials, Inc. of Lowell, Massachusetts may be sufficiently stiff and strong enough to withstand insertion and act independently during insertion. Alternatively, the extended fibers may be stiffened through the use of, for example, polymers, metal coatings, or ceramic coatings.

The laminate envisioned in this disclosure include, for example, two-dimensional fabrics, three-dimensional textiles, unidirectional fabrics, or non-woven textiles. The laminate may be, for example, dry, infused or pre-impregnated with binders, particulate, whisker or other fillers. The laminate may also be a unidirectional tape with fibers spread evenly then notched or slit and reshaped for the joint. It is appreciated that the laminate may be one or multiple layers and may be continuous about the joint or only located in one or multiple discrete locations. It is appreciated that a gap filling preform may be applied at the joints between the laminate and the preform components.

An example embodiment of the present disclosure may be utilized in the manufacture of an example hollow ceramic matrix composite vane, as may be used in a typical gas turbine engine. The vane may be pressurized internally while in service and may be made of a SiC/SiC composite. The vane may further be provided with integral endwalls. The top and bottom of the vane preform may be primarily constructed of Hi Nicalon type S fiber and be provided with protruding SCS Ultra fibers that run the full length of the vane preform body and protrude from the ends 0.150 inches. The endwall preforms are laminated independently at 0.180 inches thick.

Each endwall preform may be registered with external tooling. The vane preform may be supported by a temporary polymer binder and an external fixture that is temporarily bonded in place. Each endwall preform is pressed into the vane preform. A deltoid gap filling preform is applied at the joints, and layers of Hi Nicalon fabric may be applied to the deltoid filler and adjacent preforms to reinforce the joints. The joined preforms may be tooled for boron nitride fiber coating by chemical vapor infiltration. The joined preform components may further be infiltrated with SiC by chemical vapor infiltration. The joined preform components may then be densified with a SiC slurry/ Si melt infiltration process. The joined preform components may now be machined to the appropriate dimensions and coated with an environmental barrier coating and/or thermal barrier coating.

Another example embodiment of the present disclosure may be utilized in the manufacture of an example solid ceramic matrix composite blade, as may be used in a typical gas turbine engine. A contoured blade preform may be fabricated using Hi Nicalon fabric with a contoured airfoil shape and an attachment feature, such as a dovetail or multi-lobe fir tree design. Two contoured plates may be independently fabricated as platform preforms, each with an edge that matches the contour of the airfoil shape on the blade preform. These edges may further be provided with extending SCS fibers.

All three preform components may be supported by appropriate tooling while the platform preforms are pressed into the blade preform. Layers of Hi Nicalon fabric may be applied from the attachment feature across the lower surface of the platform preforms. Layers of Hi Nicalon fabric with a cutout of the airfoil shape cross-section may also be applied on the upper surfaces of the platform preforms. The layers of Hi Nicalon fabric reinforce the joint from both sides and may extend fore and aft of the blade preform. The joined preform components may be tooled for boron nitride fiber coating by chemical vapor infiltration. The joined preform components may further be infiltrated with SiC by chemical vapor infiltration. The joined preform components may then be densified with a SiC slurry/Si melt infiltration process. The joined preform components may now be machined to the appropriate dimensions and coated with an environmental barrier coating and/or thermal barrier coating.

Yet another example embodiment of the present disclosure may be utilized in the manufacture of a seal segment having an anti-rotation feature. A curved seal segment preform may be fabricated from a simple laminate cross-section using Hi Nicalon fabric. Instead of local thickening or machining a groove or notch into the seal segment, a 0.250 inch wide by 0.500 inch long by 0.250 inch high anti-rotation preform is independently manufactured with polymer rigidized bundles of Hi Nicalon fiber extending 0.125 inches from a surface of the anti-rotation preform.

The curved seal segment and anti-rotation preform may be supported by appropriate tooling while the two preform components are aligned and pressed together. The joined preform components may be tooled for boron nitride fiber coating by chemical vapor infiltration. The joined preform components may further be infiltrated with SiC by chemical vapor infiltration. The joined preform components may then be densified with a SiC slurry/ Si melt infiltration process. The joined preform components may now be machined to the appropriate dimensions and coated with an environmental barrier coating and/or thermal barrier coating.

It is appreciated that the above examples are only example embodiments of the present disclosure and that the disclosed dimensions and components may vary. It is further appreciated that many additional embodiments are envisioned for metal matrix and polymer matrix components. Furthermore, while it is envisioned that the joining end surfaces abut one another, a slight gap may exist between these surfaces prior to infiltration and densification.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

I claim:

1. A method comprising:
providing a first ceramic matrix composite preform component having a plurality of first component fibers integral with a main body of the first ceramic matrix composite preform component, wherein a portion of the plurality of first component fibers are extended fibers that protrude away from a first end surface of the main body;
providing a second ceramic matrix composite preform component having a plurality of second component fibers; and
inserting the extended fibers of the plurality of first component fibers at least partially into the second ceramic matrix composite preform component to create a joint at an interface of the first end surface of the first ceramic matrix composite preform component and a second end surface of the second ceramic matrix composite preform component, wherein the extended fibers are woven into the first ceramic matrix composite preform component, but not woven into the second ceramic matrix composite preform component.

2. The method of claim 1, which further includes stiffening the plurality of first component fibers and/or the plurality of second component fibers with at least one material selected from the group consisting of polymers, metal coatings, and ceramic coatings.

3. The method of claim 1, which further includes lubricating the extended fibers to reduce damage during the inserting.

4. The method of claim 1, which further includes extending the at least a portion of the plurality of first component fibers from the main body of the first ceramic matrix composite preform component through compression of the main body with the second ceramic matrix composite preform component.

5. The method of claim 1, which further includes applying a reinforcement adjacent to the first ceramic matrix composite preform component and the second ceramic matrix composite preform component.

6. The method of claim 1, which further includes forming interstitial openings in the second ceramic matrix composite preform component to correspond with a spacing of the extended fibers of the plurality of first component fibers.

7. The method of claim 1, wherein the at least a portion of the plurality of first component fibers are formed from a slit unidirectional tape, and wherein the first ceramic matrix composite preform component comprises a matrix made of at least one material selected from the group consisting of polymers, metals, silicon carbide, and silicon/silicon carbide.

8. The method of claim 1, which further includes vibrating at least one of the first ceramic matrix composite preform component and the second ceramic matrix composite preform component during the inserting.

9. A method comprising:
providing a first ceramic matrix composite preform component having a plurality of fibers, wherein a portion of the plurality of fibers comprise extended fibers are configured to protrude away from a first end surface;
providing a second ceramic matrix composite preform component;
compressing a main body of the first ceramic matrix composite preform component against a main body of the second ceramic matrix composite preform component to expose the extended fibers; and
penetrating at least a portion of the extended fibers through a surface of a main body of the second ceramic matrix composite preform component to create a joint at an interface of a surface of the first ceramic matrix composite preform component and the surface of the second ceramic matrix composite preform component, wherein the extended fibers are woven into the first ceramic matrix composite preform component.

10. The method of claim 9, which further includes reducing numbers of the plurality of fibers to ease insertion of the extended fibers through the surface of the main body of the second ceramic matrix composite preform component.

11. The method of claim 9, which further includes inserting the at least a portion of the extended fibers in a main body of the first ceramic matrix composite preform component.

12. The method of claim 9, further comprising applying a lubricant over the extended fibers prior to inserting the extended fibers into the first ceramic matrix composite preform component.

13. The method of claim 9, further comprising applying an ultrasonic vibration to the extended fibers during inserting the extended fibers into the first ceramic matrix composite preform component.

14. The method of claim 9, wherein the extended fibers have a stiffness that is greater than the other of the plurality of fibers.

15. A method comprising:
providing a first component comprising a first end surface, a plurality of extended fibers protruding away from the first end surface, and a set of fibers in addition to the extended fibers which protrude away from the first end surface, wherein the set of fibers has a stiffness which is less than the stiffness of the extended fibers such that the set of fibers yields against a second end surface when the extended fibers are inserted into a second component, and wherein the first component is a ceramic matrix composite preform;

providing the second component comprising the second end surface, wherein the second component is a ceramic matrix composite preform; and inserting at least a portion of the extended fibers into an internal space of the second component to create a joint at an interface of the first end surface of the first component and the second end surface of the second component, wherein the extended fibers are woven into the first component.

16. The method of claim 15, further comprising inserting a portion of the extended fibers into a third component positioned in the joint between the first component and the second component, wherein the third component is a ceramic matrix composite preform.

17. The method of claim 15, further comprising forming a ceramic matrix composite by infiltrating the first component and second component with a ceramic material.

18. The method of claim 15, further comprising applying a laminate strip to the joint.

19. The method of claim 15, further comprising stiffening the plurality of extended fibers such that the plurality of extended fibers have sufficient rigidity to act independently from a plurality of interwoven fibers of the second component when the extended fibers are inserted into the internal space of the second component.

20. The method of claim 15, further comprising applying a coating to the extended fibers to increase the stiffness of the extended fibers.

* * * * *